(12) United States Patent
Cao et al.

(10) Patent No.: US 7,179,860 B2
(45) Date of Patent: Feb. 20, 2007

(54) CROSSLINKED POLYMER ELECTROLYTE MEMBRANES FOR HEAT, ION AND MOISTURE EXCHANGE DEVICES

(75) Inventors: Liwei Cao, 17819D Jefferson Way, Lutz, FL (US) 33558; Scott G. Ehrenberg, 1844 Kinsmere Dr., New Port Richey, FL (US) 34655; Joseph M. Serpico, 2533 Dolly Bay Dr., Unit 106, Palm Harbor, FL (US) 34684

(73) Assignees: Liwei Cao FL (US); Scott G. Ehrenberg, New Port Richey, FL (US); Joseph M. Serpico, Palm Harbor, FL (US)

( * ) Notice: Subject to any disclaimer, the term of this patent is extended or adjusted under 35 U.S.C. 154(b) by 0 days.

(21) Appl. No.: 11/033,461

(22) Filed: Jan. 11, 2005

(65) Prior Publication Data

US 2005/0215728 A1    Sep. 29, 2005

Related U.S. Application Data

(63) Continuation-in-part of application No. PCT/US04/30936, filed on Sep. 22, 2004, and a continuation-in-part of application No. 10/268,039, filed on Oct. 9, 2002, now Pat. No. 6,841,601, which is a continuation-in-part of application No. 10/098,928, filed on Mar. 13, 2002, now abandoned.

(60) Provisional application No. 60/505,283, filed on Sep. 23, 2003, provisional application No. 60/327,746, filed on Oct. 9, 2001, provisional application No. 60/275,459, filed on Mar. 13, 2001.

(51) Int. Cl.
*C08L 9/06* (2006.01)
*C08K 3/5415* (2006.01)
*C08K 3/5425* (2006.01)
*C08K 3/10* (2006.01)

(52) U.S. Cl. ............... 524/575; 524/398; 524/413; 524/261; 524/264

(58) Field of Classification Search ............... 524/575, 524/398, 261, 264, 413
See application file for complete search history.

(56) References Cited

U.S. PATENT DOCUMENTS

| | | | | |
|---|---|---|---|---|
| 4,086,171 | A * | 4/1978 | Wood et al. | 508/390 |
| 5,329,010 | A * | 7/1994 | Okamoto et al. | 546/342 |
| 5,516,831 | A * | 5/1996 | Pottick et al. | 524/474 |
| 6,110,616 | A * | 8/2000 | Sheikh-Ali et al. | 429/33 |
| 6,383,391 | B1 * | 5/2002 | Ehrenberg et al. | 210/640 |
| 6,413,298 | B1 * | 7/2002 | Wnek et al. | 95/52 |
| 2003/0176582 | A1 * | 9/2003 | Bening et al. | 525/242 |

* cited by examiner

*Primary Examiner*—David W. Wu
*Assistant Examiner*—Rip Lee
(74) *Attorney, Agent, or Firm*—Heslin Rothenberg Farley & Mesiti, P.C.

(57) ABSTRACT

An organic-inorganic hybrid is derived from combining at least one inorganic alkoxide and a hydrogenated sulfonated block copolymer containing a controlled distribution copolymer block of a conjugated diene and a mono alkenyl arene, where the controlled distribution copolymer block has terminal regions that are rich in conjugated diene units and a center region that is rich in mono alkenyl arene units. The inorganic alkoxide may be an alkoxysilane compound or composition.

19 Claims, 3 Drawing Sheets

CROSSLINKED POLYMER ELECTROLYTE MEMBRANES FOR HEAT, ION AND MOISTURE EXCHANGE DEVICES

CROSS-REFERENCE TO RELATED APPLICATIONS

This application is a continuation-in-part of U.S. non-provisional application Ser. No. 10/268,039, filed on Oct. 9, 2002, now U.S. Pat. No. 6,841,601, and copending International application number PCT/US04/30936, filed on Sep. 22, 2004. U.S. Non-provisional application, Ser. No. 10/268,039, filed on Oct. 9, 2002, claims priority from U.S. provisional application, Ser. No. 60/327,746, filed Oct. 9, 2001, now abandoned and U.S. non-provisional application, Ser. No. 10/098,928, now abandoned filed Mar. 13, 2002, which claimed priority from U.S. provisional applications 60/275,459, filed Mar. 13, 2001, and 60/327,746, filed Oct. 9, 2001. International application number PCT/US04/30936, filed on Sep. 22, 2004, claims priority from U.S. provisional application Ser. No. 60/505,283, filed Sep. 23, 2003.

BACKGROUND OF THE INVENTION

A unitary humidity exchange cell (or HUX), as the name implies, is an element of a device that is capable of transferring water or other highly polar liquid or gas from one side of the cell to the other by action of a difference in some quantity or gradient across said cell. A key operational characteristic of the HUX cell is that a difference of some intensive or extensive property of the system (relative to the surrounding) leads to a gradient change of said property to effect mass transfer of water or some other highly polar liquid or gas from one side of the membrane to the other with or without an accompanying flow of electrons, protons, ions or molecules other than said water or other highly polar liquid or gas. It is under the influence of this property that exchange in liquid water or some other highly polar liquid or gas occurs across the permaselective membrane. This transfer of water or some other highly polar liquid or gas may or may not be accompanied by evaporation of said water or other highly polar liquid or gas into (or from) the stream by the absorption of heat or adiabatically or by some other thermodynamic means; for example the condensation or evaporation of liquid water or some other highly polar liquid or gas or the simple diffusion of water or some other highly polar liquid or gas into a pure liquid stream. A finite gradient across the membrane must exist in some quantity; examples are vapor pressure, osmotic or hydrostatic pressure, chemical, thermochemical, electrochemical, magnetochemical potential, as well as thermal (temperature or heat content), electric, electromagnetic, thermoelectric, or electrothermal potential difference. There must be at least two streams, one supplied to each surface of said membrane by some means either as a liquid or vapor flow each of which differs in at least one identical property of the system. The system attempts to reach a thermodynamic equilibrium by transporting water or some other highly polar liquid or gas from one stream to the other. The orientation of the streams to one another is considered arbitrary for the invention; these may be counter flow, coflow, crossflow, mixed flow or any other geometric arrangement of one or more streams. Water or some other highly polar liquid or gas transport (e.g. hydrodynamic, electrohydrodynamic, magnetohydrodynamic, diffusion, migration, or convection) occurs until the imposed gradient can no longer meet the physicochemical constraints of the system required to sustain the motion. In many cases, the exchange of water or some other highly polar liquid or gas between the streams is slow, but this may be due to some other limiting factor, such as, boundary layer effects, concentration polarization, hydrostatic pressure lag or gravity, surface tension effects, and convective or frictional effects. However, once these engineering design or system effects are minimized, inevitably, the exchange or transport of water or some other highly polar liquid or gas is rate-limiting if the permeability of the membrane to water or some other highly polar liquid or gas is poor. Hence, an important object of the invention is that hydrophilic polymer membrane has high permeability to water or some other highly polar liquid or gas; more than necessary for most applications. The hydrophilic polymer membrane (or formulation) must be mechanically supported and there must be means to supply the two streams to said surfaces. A second object of the invention is that the three sub-elements be fabricated as one unit by conventional means at low cost. This requires that the hydrophilic polymer wet the support, achieve intimate contact and demonstrate exceptional adhesion to it. Therefore, a third object of the invention is that the support be a polyolefin or blend thereof such that one component of said hydrophilic polymer is similar in chemical structure to one component of the support.

HUX cell design is general in that water (liquid or vapor) or other highly polar material (liquid or vapor) can be transferred between any two fluids. Examples of applications are per-vaporation, humidification and dehumidification of fuel cell streams in stacks and devices, drying gases at pressure, tertiary oil recovery, process control for chemical manufacture of chemicals for which water is a reactant, isolation of minerals from mining fluids, industrial separation of oil-water emulsions, microfiltration and ultrafiltration of colloidal suspensions and biological or organic macromolecules for purification, maintaining water content of methanol in direct methanol fuel cells, reverse osmosis for isolation of fresh water from brine, electrolysis cells, dialysis, electro-dialysis, piezo-dialysis, electro-osmosis and chloro-alkali cells.

SUMMARY OF THE INVENTION

The present invention relates to cells for transferring heat, ions and/or moisture between a first fluid and a second fluid. Such a cell comprises at least one hydrophilic organic-inorganic hybrid membrane, disposed between at least one first chamber for flow of the first fluid therethrough and at least one second chamber for flow of the second fluid therethrough; whereby heat and moisture is transferable between the first fluid and second fluid via the membrane. The membranes are prepared from an organic-inorganic hybrid derived from combining at least one inorganic alkoxide and a hydrogenated sulfonated block copolymer. The cell may additionally include at least one spacer disposed on a surface of the membrane. The spacer(s) may have a dimension normal to the surface of the membrane corresponding to a height of the first chamber; the longitudinal axis of the at least one spacer may be oriented parallel to a direction of flow of the first fluid in the first chamber. The direction of flow of the first fluid in the first chamber may be orthogonal to a direction of flow of the second fluid in the second chamber, or it may be opposite to it. In some embodiments, a plurality of synthetic polymer ribs are used as spacers; in others, the spacer is merely a bead of an adhesive composition; in still others, the spacer is a corrugated sheet composed of paper or plastic. The invention also relates to cells containing a plurality of hydrophilic organic-inorganic hybrid membranes, and a plurality of alternating first chambers and second chambers, each separated by such a membrane.

DETAILED DESCRIPTION OF THE INVENTION

Figure 1:
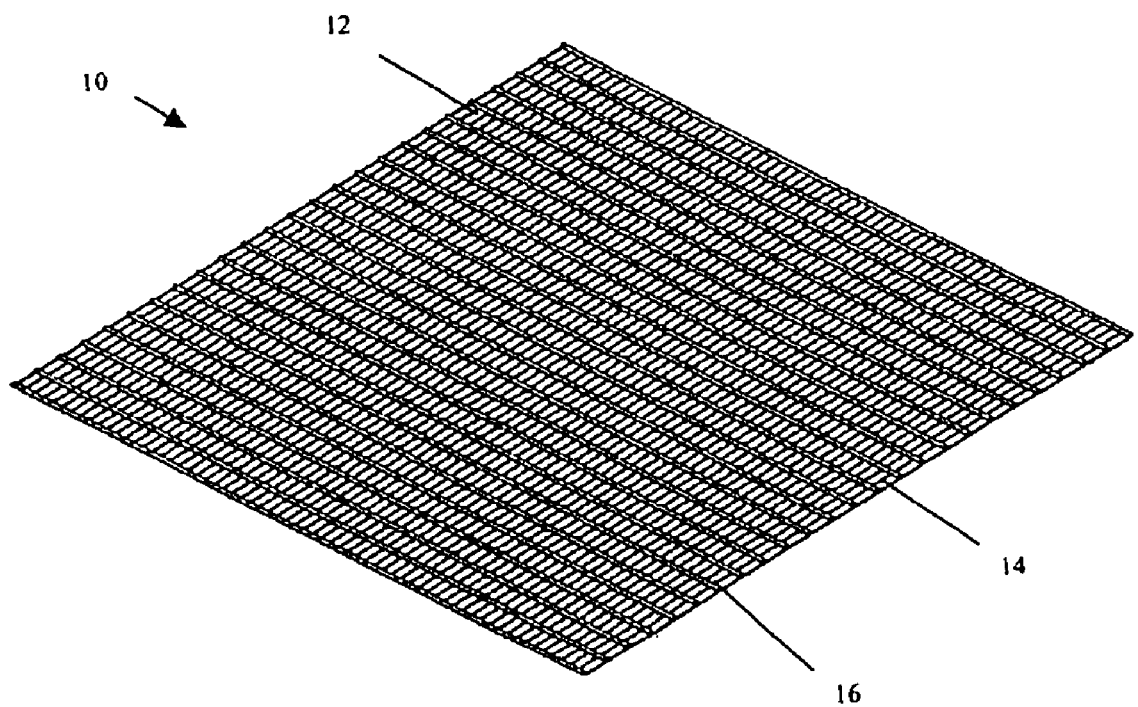
FIG. 1 shows a hydrophilic organic-inorganic hybrid membrane for use in a humidity exchange cell according to present invention.

FIG. 1 shows a single hydrophilic organic-inorganic hybrid membrane 10 for use in a humidity exchange cell according to the present invention. The membrane includes a continuous film of a humidity-conducting polymer 12 bonded to a reinforcing substrate 14 in the form of a cross-laid mesh or netting. Reinforcing substrate 14 strengthens the membrane so it can be handled, and allows the membrane to withstand pressure differentials without deflecting. As shown in FIG. 1, there are spacers, ribs or ridges 16 adhered to the surface of membrane 10 and running in one direction. The other side of the membrane is a smooth surface of humidity-conducting polymer 12. The height of spacer 16 sets the layer-to-layer spacing. Air channels in the humidity exchange cell are formed by spacers 16 when they rest against the smooth surface of the membrane that is placed on top of it.

The humidity-conducting polymer is preferably an organic-inorganic hybrid. In these hybrid materials, the organic (polymer) and inorganic components are combined at the molecular level; the hybrids may be derived from a reaction between the polymer and the inorganic alkoxide, resulting in a polymer matrix nanocomposite. The presence of a finely dispersed inorganic oxide gel/polymer network provides good mechanical strength, extraordinary thermal stability, dimensional stability, good transport properties, ionic conductivity and/or permeability and permeselectivity.

In particular, the hybrid is prepared by combining a hydrogenated sulfonated block copolymer having a controlled distribution copolymer block of a conjugated diene and a mono alkenyl arene with an inorganic alkoxide having the formula:

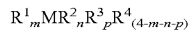

$$R^1_m M R^2_n R^3_p R^4_{(4-m-n-p)}$$

wherein

M is Si, Ti, Zr, or mixtures thereof;

$R^1$, $R^2$, $R^3$ and $R^4$ are independently alkyl, substituted alkyl, alkenyl, acyloxy, alkoxy, halo, amino, mercapto, or epoxy;

m, n and p are independently 0, 1, 2, 3 or 4; and at least one of $R^1$, $R^2$, $R^3$ and $R^4$ is alkoxy.

In some embodiments, M may be limited to Si or Zr; Si and Zr are particularly useful. Examples of specific inorganic alkoxides include tetraethylorthosilicate, vinyltriethoxysilane, vinyltrimethoxysilane, and zirconium bis(diethyl citrato)dipropoxide.

The organic-inorganic hybrid materials may be prepared by using a sol-gel type process, which is an acid or base-catalyzed hydrolysis-condensation reaction of inorganic alkoxides. Where only the inorganic alkoxide is present, the reaction typically is run in a solvent containing water, and proper drying of the swollen gel produces an inorganic oxide glass. For example, where the inorganic alkoxide is an alkoxy silane, polysilicates typically grow in molecular weight and chain length within the polymer until most or all of the alkoxy groups are removed and a nonlinear network of Si—O—Si remains. Stable condensation products are also form with other oxides such as those of aluminum, zirconium, tin, and nickel. Where at least one of $R^1$, $R^2$, $R^3$ and $R^4$ is a nonhydrolyzable organic functional group, typically vinyl, amino, chloro, epoxy, mercapto, the functional group may attach to the polymer while the alkoxy group(s) may attach to silicon. As the hydrolysis reaction progresses, the inorganic alkoxides may condensation to form oligomers, and then polysilcates.

Inorganic alkoxides include tetralkoxysilanes [$Si(OR)_4$], tetraalkyl titanates [$Ti(OR)_4$] and tetraalkyl zirconates [$Zr(OR)_4$], where R is alkyl, particularly, methyl, ethyl, propyl, isopropyl, n-butyl, or t-butyl, and organosilanes [$R_nSiX_{(4-n)}$], organic titanates [$R_nTiX_{(4-n)}$], organic zirconates [$R_nZrX_{(4-n)}$]. The most common alkoxy groups are methoxy, and ethoxy. Other inorganic alkoxides that may be useful in hydrophilic organic-inorganic hybrids used as heat, ion and moisture tranfer membranes are based on aluminum, tin and boron.

A humidity-conducting polymer for use in a humidity exchange cell of the present invention typically contains at least 20 weight % of residues derived from styrene. More preferably, the copolymer contains from 20 to 80 weight % styrene, and most preferably, about 65 weight % styrene. The range of weight average molecular weight ($M_w$) of the polymer of the invention is from about 20,000 grams/mole to about 1,000,000 grams/mole, and preferably from about 50,000 grams/mole to 900,000 grams/mole. The sulfonated polymer used for the membranes of the present invention are preferably water-insoluble. Water-insoluble is defined as having a solubility of less than 0.5 grams of polymer in 100 grams of water at 100° C.

The polymer in the organic-inorganic hybrid is preferably derived from an at least partially sulfonated copolymer that possesses a low equivalent weight, from 1000 down to 100, preferably 700 down to 400 and most preferably 690 down to 520. Partially sulfonated styrene-olefin copolymers are generally preferred. Specifically, the polymer is a hydrogenated sulfonated block copolymer having controlled distribution blocks.

"Controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows: First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring. Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6. The styrene blockiness is simply the percentage of blocky styrene to total styrene units:

Blocky %=100 times (Blocky Styrene Units/Total Styrene Units)

Expressed thus, Polymer-Bd-S—(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

The controlled distribution copolymer block has two distinct types of regions—conjugated diene rich regions on the end of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Anionic, solution copolymerization to form the controlled distribution copolymers can be carried out using, to a great extent, known and previously employed methods and materials. In general, the copolymerization is attained anionically, using known selections of adjunct materials, including polymerization initiators, solvents, promoters, and structure modifiers, but as a key feature, in the presence of a certain distribution agent. Such distribution agent is, in preferred embodiments, a non-chelating ether. Examples of such ether compounds are cyclic ethers such as tetrahydrofuran and tetrahydropyran and aliphatic monoethers such as diethyl ether and dibutyl ether. In some cases, particularly where the vinyl content of the conjugated diene is to be over 50%, it may be necessary to use a chelating agent, including dialkyl ethers of ethylene glycol and aliphatic polyethers such as diethylene glycol dimethyl ether and diethylene glycol diethyl ether. Other distribution agents include, for example, ortho-dimethoxybenzene or "ODMB", which is sometimes referred to as a chelating agent. Preferably the ether is an aliphatic monoether, and more preferably diethyl ether. Such copolymerization can be conducted as a batch, semi-batch, or continuous preparation, with batch being most preferred, but regardless, it is important that the randomization agent be present in the selected solvent prior to or concurrent with the beginning of the copolymerization process.

The introduction of the distribution agent counteracts the preference of the growing chain end to attach to one monomer over another. For example, in the case of styrene and a diene, the preference would be toward the diene. This distribution agent operates to promote more efficient "controlled distribution" copolymerization of the two monomers because the living chain end "sees" one monomer approximately as easily as it "sees" the other. The polymerization process is thereby "tuned" to allow incorporation of each of the monomers into the polymer at nearly the same rate. Such a process results in a copolymer having no "long runs" of either of the monomer components—in other words, a controlled distribution copolymer as defined hereinabove. In the preferred process, the mono alkenyl arene monomer will be nearly consumed by the time that the slow addition of the second aliquot of diene is complete, so that the polymerization ends rich in the conjugated diene. Short blocks of the conjugated diene monomer may be formed throughout the polymerization, but blocks of the mono alkenyl arene monomer are only formed when the concentration of the conjugated diene monomer becomes quite low. Under the preferred conditions, the cumulative percentage of the mono alkenyl arene monomer in the B block peaks at about 40%–60% overall conversion, but only exceeds the final value by about 25%–30%. The result of this relatively uniform distribution of monomers is a product having a single Tg, which is a weighted average of the Tg values of the two corresponding homopolymers.

As noted above, the distribution agent is preferably a non-chelating ether. By "non-chelating" is meant that such ethers will not chelate with the growing polymer, that is to say, they will not form a specific interaction with the chain end, which is derived from the initiator compound (e.g., lithium ion). Because the non-chelating ethers used in the present invention operate by modifying the polarity of the entire polymerization charge, they are preferably used in relatively large concentrations. Where diethyl ether, which is preferred, is selected, it is preferably at a concentration from about 0.5 to about 10 percent, preferably about 1 to about 10 percent, by weight of the polymerization charge (solvent and monomers), and more preferably from about 3 to about 6 percent by weight. Higher concentrations of this monoether can alternatively be used, but appear to increase cost without added efficacy. When the distribution agent is ODMB, the amount used is typically about 20 to about 400 parts by million weight ("PPMW"), based on the total reactor contents, preferably about 20 to about 40 PPMW for low vinyl products and about 100 to 200 PPMW for higher vinyl products.

The microstructure or vinyl content of the conjugated diene in the controlled distribution copolymer block is typically controlled. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For selectively hydrogenated block copolymers, preferably about 30 to about 70 mol percent of the condensed butadiene units should have 1,2 configuration. For unsaturated block copolymers, preferably about 20 to about 40 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the controlled distribution copolymers include the initial monomers. The alkenyl arene can be selected from styrene, alpha-methylstyrene, para-methylstyrene, vinyl toluene, vinyinaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic copolymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the novel copolymers are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As discussed above, an important discovery is the control of the monomer feed during the polymerization of the controlled distribution block. To minimize blockiness, it is desirable to polymerize as much of the styrene as possible in the presence of butadiene. Towards that end, a preferred process adds the styrene charge as quickly as possible, while adding the butadiene slowly, so as to maintain a concentration of no less than about 0.1% wt of butadiene for as long as possible, preferably until the styrene is nearly exhausted. If the butadiene falls below this level, there is a risk that a styrene block will form at this point. It is generally undesirable to form a styrene block during the butadiene charge portion of the reaction.

In a two-reactor polymerization scheme, this is most readily accomplished by adding about 80 to 100 percent of the mono alkenyl arene to the second reactor, along with about 10 to about 60 percent of the conjugated diene. The monomers are then caused to start polymerization via transfer of the living polymer from the first reactor. After about 5 to 60 mol percent of the monomers have polymerized, the remaining portion of the mono alkenyl arene (if any) is added and the remaining conjugated diene monomer is added at a rate that maintains the concentration of the conjugated diene monomer at no less than about 0.1% weight. The rate of diene monomer addition will be determined by the styrene content of the midblock, the reaction temperature and the type and concentration of the distribution control agent used. Reaction rates are relatively fast in the presence of 6%–10% diethyl ether. In this system, the diene is typically charged over 15 to 60 minutes. Rates for both monomers are slower in the presence of 0.5%–1% diethyl ether or 35–40 PPM o-dimethoxybenzene. In this solvent system, it is more typical to add the diene over 60 to 90 minutes. The higher the midblock styrene, the more advantageous it is to add the diene slowly. If the polymer is to be prepared in a fully sequential process, it is preferable to ensure that the butadiene addition continues until about 90% of the monomers in block B1 have been polymerized, and the percentage of the mono alkenyl arene monomer in the non-reacted monomer pool has been reduced to less than 20% weight, preferably less than 15% weight. In this way the formation of styrene blocks is prevented throughout the majority of the polymerization and there is sufficient conjugated diene left at the end of the polymerization to ensure that the terminal region of the B1 block is richer in the diene monomer. The resulting polymer block has diene rich regions near the beginning and the end of the block and an arene rich region near the center of the block. In products of the preferred process, typically the first 15 to 25% and the last 75 to 85% of the block are diene rich, with the remainder considered to be arene rich. The term "diene rich" means that the region has a measurably higher ratio of diene to arene than the center region. Another way to express this is the proportion of mono alkenyl arene units increases gradually along the polymer chain to a maximum near the middle or center of the block and then decreases gradually until the polymer block is fully polymerized. In a preferred embodiment, all of the mono alkenyl arene and about 10 to 20 percent of the conjugated diene are charged to the reactor, and the remainder of the conjugated diene is added after about 5 to about 10 percent of the original monomers have polymerized.

It is typically possible to achieve the desired distribution of the arene monomer in the final product using the process described above if fairly high levels of the distribution control agent are used. At higher midblock styrene levels and low levels of the distribution control agent, some blockiness is unavoidable. It is preferable to prepare these products by coupling. This insures that any blocky styrene that is formed is located at some distance from the endblocks. When polymers are prepared by coupling, it is preferable to reserve 5% to 10% of the diene monomer, and add this charge once the polymerization of the arene monomer is complete. This ensures that all of the chains end in a diene unit. The living diene chain ends generally react more efficiently with coupling agents.

If the products are being prepared in a single reactor process in which all of the B1 monomer is charged to a reactor containing the living A block, it is preferable to start the diene monomer addition about 1 minute before starting the arene monomer addition. It is also preferable to charge both monomers rapidly at first and then decrease the diene addition rate once the majority of the arene monomer has been added. This process ensures that the initial region of the B1 block will be rich in the diene monomer, and builds a large enough pool to avoid becoming starved in the diene monomer early in process step. As discussed above, the optimal rates will depend on the styrene content of the midblock, the reaction temperature and the type and concentration of the distribution control agent used.

For the controlled distribution or B block the weight percent of mono alkenyl arene in each B block is between about 10 weight percent and about 75 weight percent, preferably between about 25 weight percent and about 50 weight percent for selectively hydrogenated polymers.

As used herein, "thermoplastic block copolymer" is defined as a block copolymer having at least a first block of one or more mono alkenyl arenes, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer, tetra-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as endblocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_nX$, or both types of structures can be combined in a mixture. In addition it is contemplated that asymmetrical, polymodal block copolymers are included, where some of the A blocks have higher molecular weights than some of the other A blocks—e.g., such a polymer could have the structure $(A_1-B)_d-X-_e(B-A_2)$ where d is 1 to 30 and e is 1 to 30, and the molecular weight of A1 and A2 blocks differ by at least 20 percent. Some A-B diblock polymer can be present but preferably at least about 70 weight percent of the block copolymer is A-B-A or radial (or otherwise branched so as to have 2 or more terminal resinous blocks per molecule) so as to impart strength.

Preparation of radial (branched) polymers requires a post-polymerization step called "coupling". In the above radial formula n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichirohydrin.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying reactions. In contrast, chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

The polymerization procedures described hereinabove, including preparation of the diene/alkenyl arene copolymer and of di-block and multi-block copolymers prepared therewith, can be carried out over a range of solids content, preferably from about 5 to about 80 percent by weight of the solvent and monomers, most preferably from about 10 to about 40 weight percent. For high solids polymerizations, it is preferable to add any given monomer, which may include, as previously noted, a previously prepared homopolymer or copolymer, in increments to avoid exceeding the desired polymerization temperature. Properties of a final tri-block polymer are dependent to a significant extent upon the resulting alkenyl content and diene content. It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled (AB)$_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

An important feature of the thermoplastic elastomeric di-block, tri-block and tetra-block polymers, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers' Tg's. Such Tg is preferably at least about −60 degrees C., more preferably from about −40 degrees C. to about +30 degrees C., and most preferably from about −40 degrees C. to about +10 degrees C. The second Tg, that of the mono alkenyl arene "glassy" block, is preferably from about +80 degrees C. to about +110 degrees C., more preferably from about +80 degrees C. to about +105 degrees C. The presence of the two Tg's, illustrative of the microphase separation of the blocks, contributes to the notable elasticity and strength of the material in a wide variety of applications, and its ease of processing and desirable melt-flow characteristics.

It should be noted that, in yet another embodiment, additional property improvements of the compositions hereof can be achieved by means of yet another post-polymerization treatment, that of hydrogenation of the block copolymer. The preferred hydrogenation is selective hydrogenation of the diene portions of the final block copolymer. Alternatively both the B blocks and the A blocks may be hydrogenated, or merely a portion of the B blocks may be hydrogenated. Hydrogenation generally improves thermal stability, ultraviolet light stability, oxidative stability, and, therefore, weatherability of the final polymer. A major advantage is that the distribution agent, such as the non-chelating monoether, which is present during the initial polymerization process, does not interfere with or otherwise "poison" the hydrogenation catalyst, and thus the need for any additional removal steps is obviated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

Once the hydrogenation is complete, it is preferable to extract the catalyst by stirring with the polymer solution a relatively large amount of aqueous acid (preferably 20–30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

In an alternative, the block copolymer may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer may be functionalized by grafting silicon or boron containing compounds to the polymer as taught in U.S. Pat. No. 4,882,384. In still another manner, the block copolymer may be contacted with an alkoxy-silane compound to form silane-modified block copolymer. In yet another manner, the block copolymer may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers may be metallated as taught in U.S. Pat. Nos. 5,206,300 and 5,276,101, wherein the polymer is contacted with an alkali metal alkyl, such as a lithium alkyl. And still further, the block copolymers may be functionalized by grafting sulfonic groups to the polymer as taught in U.S. Pat. No. 5,516,831. All of the patents mentioned in this paragraph are incorporated by reference into this application.

The last step, following all polymerization(s) as well as any desired post-treatment processes, is a finishing treatment to remove the final polymer from the solvent. Various means and methods are known to those skilled in the art, and include use of steam to evaporate the solvent, and coagulation of the polymer followed by filtration. The final result is a "clean" block copolymer useful for a wide variety of challenging applications, according to the properties thereof. These properties include, for example, the final polymer's stress-strain response, which shows that a composition exhibits a stiffer rubbery response to strain, therefore requiring more stress to extend the same length. This is an extremely useful property that allows the use of less material to achieve the same force in a given product. Elastic properties are also modified, exhibiting increasing modulus with increasing elongation, and there is a reduced occurrence of the rubbery plateau region where large increases in elongation are required to procure an increase in stress. Another surprising property is increased tear strength. The controlled distribution copolymers offer additional advantage in their ability to be easily processed using equipment generally designed for processing thermoplastic polystyrene, which is one of the most widely known and used alkenyl arene polymer. Melt processing can be accomplished via extrusion or injection molding, using either single screw or twin screw techniques that are common to the thermoplastics industry. Solution or spin casting techniques can also be used as appropriate.

In the U.S. Pat. No. 5,516,831 to Pottick, et al. ('831), it is taught to sulfonate a block copolymer. Therein it is disclosed that hydrogenated block copolymers are sulfonated primarily in the alkenyl arene blocks by reaction with a sulfonation reagent that selectively sulfonates the alkenyl arene blocks in preference to the hydrogenated polydiene blocks. It is further disclosed therein that acyl sulfates exhibit the desired preference for sulfonation of the alkenyl arene blocks. The '831 reference teaches that acetyl sulfate is the most preferred sulfonation reagent. Acetyl sulfate ($CH_3CO_2$—$SO_3H$) should be prepared fresh before each sulfonation reaction or prepared in situ by the reaction of acetic anhydride with sulfuric acid. While the reaction of sulfuric acid and acetic anhydride is the preferred method of preparing the acetyl sulfate, any method known to those of ordinary skill in the art of preparing acetyl sulfate to be useful can be used with the method.

The sulfonated polymers are preferably prepared with about one (1) sulfonic acid or sulfonate group per aromatic ring. Preferably, the functionality level is on the average from about one (1) functional group per molecule of the copolymer to about one functional group per aromatic ring, and more preferably on the average from about three (3) functional groups per molecule of the copolymer to about one (1) functional group per two aromatic rings of the molecule.

The sulfonated polymers can be prepared wherein there are additional groups between the sulfonic acid group and the aromatic ring of the block copolymer. For example, the copolymers can have the general formula:

—Ar(X)— wherein Ar is an aromatic ring of the block copolymer and X is —$SO_3H$ or —$P(O)(OR^8)O$—$R^9$—$SO_3H$ where $R^8$ is hydrogen or lower alkyl and $R^9$ is lower alkylene. Preferably the sulfonic acid group is bonded directly to the aromatic ring but these and obvious variations of this general formula are also within the scope. The sulfonated block copolymers can also be prepared by grafting a sulfonated polymer to a block copolymer through, for example, reaction with residual unsaturation in the block copolymer.

The sulfonated block copolymers can be prepared in either a batch process or a continuous process. In a batch process, to achieve high levels of sulfonation, it can be desirable to balance both the solubility of the sulfonated polymer and the temperature of the reaction. The unsulfonated block copolymers are relatively soluble in solvents, such as dichloroethane. As sulfonation occurs, the sulfonated polymer can become progressively more insoluble. Solubility of the polymer in the solvent often cannot be controlled by raising the reaction temperature because excessive temperature can cause crosslinking and other undesirable effects in the product sulfonated block copolymers. In order to avoid these problems, it can be desirable to run the sulfonation at a temperature that is high enough to ensure reasonable solubilities while not exceeding temperatures at which undesirable effects occur with the polymer. This temperature range happens to be about the same for both batch and continuous process and is from about 30° C. to about 70° C., preferably from about 35° C. to about 55° C., more preferably from about 38° C. to about 50° C., and most preferably about 50° C.

In a batch process, it is generally desirable to run the reaction with a polymer concentration of from about 1 to about 5 percent by weight polymer in the solvent. More preferably, it is desirable to run a batch process with a polymer concentration of from about 2 to about 4 percent by weight polymer in the solvent. Most preferably it is desirable to run a batch process with a polymer concentration of 3 percent by weight polymer in the solvent.

In a continuous process it is generally desirable to run the reaction with a polymer concentration of from about 0.1 to about 10 percent by weight polymer in the solvent. More preferably, it is desirable to run a batch process with a polymer concentration of from about 0.5 to about 2.5 percent by weight polymer in the solvent. Most preferably it is desirable to run a batch process with a polymer concentration of 2 percent by weight polymer in the solvent.

For a typical continuous process, the polymer is dissolved in a solvent, preferably a chlorinated hydrocarbon, nitro hydrocarbon, fluorinated hydrocarbon, or supercritical carbon dioxide. Temperature of the polymer solution is reduced to −5° C. to 15° C. The sulfonate reactant is prepared by vaporization of $SO_3$ and dilution to a low concentration level in a gas, such as dry air, nitrogen or sulfur dioxide, or a solvent, such as a chlorinated hydrocarbon, nitro hydrocarbon, fluorinated carbon, supercritical carbon dioxide, or liquid sulfur dioxide. In one embodiment, the solvent is 1,2-dichloroethane, methylene chloride, chloroform, nitromethane, or a mixture thereof. The polymer solution and $SO_3$ reactant are subject to counter-flow in a falling film reactor, keeping the polymer solution cold during the reaction process. Unreacted $SO_3$ gas exiting the reactor is collected and neutralized. Alternately, the polymer solution and $SO_3$ reactant are mixed in a high shear environment, keeping the mixing time under one second. Ideally the mixing is done under elevated pressure to keep the $SO_3$ in solution. The output from the mixing process is collected and the mixed solution is agitated for an additional 120 seconds while holding the temperature at −5° C. to 15° C. The sulfonated polymer solution/suspension is collected and the solvent boiled off. In a preferred embodiment, the process additionally comprises recovering and reusing the solvent. Sulfur dioxide may replace air or nitrogen as the carrier gas, especially for the case where sulfur trioxide is prepared in-line by oxidation of sulfur dioxide.

While not wishing to be bound by any theory, it is believed that the polymers lend themselves to sulfonation due to the presence of aromatic groups within the midblocks of the copolymers. In a conventional block copolymer, the solubility of the polymer is affected by the substantial absence of aromatic groups in the midblock. The aromatic groups in the midblock allow the copolymers to stay soluble further into the reaction allowing for additional sulfonation of the molecules. For a batch process, for example, a block copolymer having about 64 percent by weight styrene groups can have a sulfonation content of from about 25 to about 70 percent. For a continuous process, for example, a block copolymer have about 64 percent by weight styrene groups can have a sulfonation content of from about 25 to about 70 percent. In a preferred embodiment the level of sulfonation should be about 30 to 40 mol percent, basis the styrene content of the polymer where the overall styrene content of the polymer is about 60 to about 70 weight percent, and the A blocks of the block copolymer have a number average molecular weight of about 10.000 to about 35,000.

The polymer is dissolved in a solvent as part of the process of performing the sulfonation. Preferably the solvent is a hydrocarbon, nitro hydrocarbon, or chlorinated hydrocarbon. In one embodiment, the sulfonation process is carried out in a solvent selected from the group consisting of 1,2-dichloroethane, trichlorobenzene, chlorobenzene, methylene chloride, chloroform and mixtures thereof. In another embodiment, the solvent is selected from the group consisting of cyclohexane, heptane, octane, nitrobenzene, nitropropane and mixtures thereof.

While the process described above is the preferred process for preparing the sulfonated copolymers, these materials can be prepared by conventional methods as well. For example, the copolymers can be sulfonated by heating the polymer in sulfuric acid, preferably using silver sulfate as a catalyst. Complexes with a number of agents such as phosphorus pentoxide, triethyl phosphate and tris (2-ethylhexyl) phosphatecan be used to modulate i.e., moderate the reactivity of sulfur trioxide. Other acyl sulfates, formed by premixing can be used and include, sulfur trioxide/acetic acid, sulfur trioxide/lauric acid, and chlorosulfonic acid/lauric acid. In addition, chlorosulfonic acid and trimethylsilyl-sulfonyl chloride have been found useful. In one embodiment, methylene units are readily inserted between the sulfonate group and the phenyl group by first carrying out an acylation of the ring with and $\alpha,\omega$-acyl/alkyl dichloride of desired carbon length and then transforming the chloride into the sulfonate. Similarly, cyclic sulfonyl esters known as sultones may be used to avoid the transformation step A unique route to sulfonated polymers is the use of sulfur dioxide and chorine gas. In still another embodiment, it is possible to first sulfonate the monomers then carry out the polymerization. The sulfonated monomers (protonic form) are sometimes polymerized in the sodium salt form or can be protected by forming the sulfonyl ester and then polymerized. Ion exchange or hydrolysis follows to obtain the protonic form of the polymer.

A sulfonation process for styrene copolymers is described in U.S. Pat. Nos. 5,468,574, 5,679,482, and 6,110,616. The preferred level of sulfonic acid functionality ranges from about one functional group per five aromatic rings (20 mol %) to about four functional groups per five aromatic rings (80 mol %), such that the equivalent weight of the resulting sulfonated polymer is from about 100 grams/sulfonate equivalent to about 1000 grams/sulfonate equivalent. For example, for a copolymer of 45 weight percent styrene, the preferred range is between one sulfonic acid group per five styrene units (20 mol %, equivalent weight=1200 grams/equivalent) to about four sulfonic acid group per five styrene units (80 mol %, equivalent weight=300 grams/equivalent). Equivalent weight may be further limited to 400–700, and even further limited to 520–690. For a copolymer of 30 weight percent styrene, the preferred range is between one sulfonic acid group per four styrene units (25 mol %, equivalent weight=1400 grams/equivalent) to four sulfonic acid groups per five styrene units (80 mol %, equivalent weight=430 grams/equivalent). The sulfonation level of the polymer may be controlled by the stoichiometric ratio of the sulfonating agent, acetyl sulfate, to the styrene content of the polymer. For example, addition of 1.0 equivalents of acetyl sulfate yields a polymer of 32 mol % sulfonation and 1.4 equivalents yields 44 mol % sulfonation. The resulting polymer possesses a low equivalent weight, from 1000 down to 100, preferably 700 down to 300 and most preferably 690 down to 380.

A sol-gel process using an alkoxy silane and incorporating a host polymer has been described in the literature. A polymer such as Nafion® perflorinated ionomer was swollen with solvent and then immersed in a solution of solvent, water, acid and alkoxidesilicate such tetraethylorthosilicate (TEOS) or vinyltriethoxysilane (VTES). TEOS or VTES and its hydrolyzed species diffused into the hose polymer and reacted to form silicate particles while the solvent was removed under heat/vacuum.

An improved process is to prepare the hybrids by forming the nanocomposite in a single major step as the polymer forms a film, and the co-dissolved in organic alkoxide, such as TEOS or VTES undergoes a sol-gel reaction, simultaneously forming a solution. This method is inherently simpler than the previous since polymer film does not have to be preformed before an in situ sol-gel reaction. Moreover, this method gives better control over how much silicate is incorporated into the polymer matrix. The previous method relied upon how much TEOS precursor could diffuse into the matrix in a given time, whereas silicate uptake is now controlled by how much precursor is charged into the polymer solution.

The micro- and macrostructure of the polymer matrix can be controlled through the optimization of several parameters, for example, coupling agents (different Si, Ti, Al, Zr, and B), pH, concentration, temperature, and solvent.

DEFINITIONS

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbonsAcyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Aryl and heteroaryl mean a 5- or 6-membered aromatic or heteroaromatic ring containing 0–3 heteroatoms selected from nitrogen, oxygen or sulfur; a bicyclic 9- or 10-membered aromatic or heteroaromatic ring system containing 0–3 heteroatoms selected from Nitrogen, oxygen or sulfur; or a tricyclic 13- or 14-membered aromatic or heteroaromatic ring system containing 0–3 heteroatoms selected from Nitrogen, oxygen or sulfur. Each of these rings is optionally substituted with 1–3 lower alkyl, substituted alkyl, substituted alkynyl, carbonyl, nitro, halogen, haloalkyl, hydroxy, alkoxy, $OCH(COOH)_2$, cyano, primary amino, secondary amino, acylamino, phenyl, benzyl, phenoxy, benzyloxy, heteroaryl, or heteroaryloxy; each of said phenyl, benzyl, phenoxy, benzyloxy, heteroaryl, and heteroaryloxy is optionally substituted with 1–3 substituents selected from lower alkyl, alkenyl, alkynyl, halogen, hydroxy, haloalkyl, alkoxy, cyano, phenyl, benzyl, benzyloxy, carboxamido, heteroaryl, heteroaryloxy, nitro or —NRR (wherein R is independently H, lower alkyl or cycloalkyl, and —RR may be fused to form a cyclic ring with nitrogen). The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Alkylaryl means an alkyl residue attached to an aryl ring. Examples are benzyl and phenethyl. Heteroarylalkyl means an alkyl residue attached to a heteroaryl ring. Examples include pyridinylmethyl and pyrimidinylethyl.

Heterocycle means a cycloalkyl or aryl residue in which one to two of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran.

Substituted alkyl, aryl, cycloalkyl, or heterocyclyl refer to alkyl, aryl, cycloalkyl, or heterocyclyl wherein up to three H atoms in each residue are replaced with halogen, haloalkyl, hydroxy, lower alkoxy, carboxy, carboxalkoxy, carboxamido, cyano, carbonyl, nitro, primary amino, secondary amino, alkylthio, sulfoxide, sulfone, acylamino, acyloxy, amidino, phenyl, benzyl, heteroaryl, phenoxy, benzyloxy, heteroaryloxy, or substituted phenyl, benzyl, heteroaryl, phenoxy, benzyloxy, or heteroaryloxy.

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

The humidity-conducting polymer may contain one or more additives, including flame retardants (suppressants and synergists), biocides (mildewicides, fungicides, anti-mold agents, antiviral agents, bacteriocides, anti-parasitic agents, and insecticides.), plasticizers, uv stabilizers (uv absorbers, and light stabilizers), antioxidants (primary or secondary) and thermal stabilizers. Any one compound may impart one or more characteristic enhancements. The basic requirements are that (a) the additive is miscible with the hydrophilic polymer, (b) it does not compromise the mechanical strength or integrity of the membrane in the cell, (c) it not reduce the performance (e.g. moisture transfer effectiveness) or lifetime of the cell in the application. Therefore, these are objects (a, b, c) of the invention. Although not an object, it is desirable that the additive, retain the activity and efficacy of said characteristic when present with the polymer in the formulation.

For biocides, a principal concern is mold and mildew growth because of the potentially low, local pH of these sulfonated hydrophilic polymers. However, resistance to other possible biological agents such as fungus, bacteria, viruses, parasites, insects or protozoa is desirable. Any biologicals that reduce the available surface area of the membrane for transfer of moisture from the stream must be prevented. Compatible chemical agents are 10,10'-oxybisphenoxarsine available from Rohm and Haas in a liquid or resin carrier under the tradname Vinyzene. An arsenic-free alternative is 4-chloro-3,5-dimethyl phenol an organic chemical available from Aldrich. These can be used effectively at loadings up to 5.0 phr. However, Dow Chemical's fungicide AMICAL 48 and bactericide BIOPAN BP PLUS, both toxic metal-free are preferred.

Flame retardancy is important insofar as additives can reduce the tendency of the cell to catch fire, spread a fire and to reduce smoke emissions. For pure liquid streams the threat of fire does not present itself, except for air/water or some other highly polar gas vapor streams at low humidity. For these applications, a non-halogen flame retardant (basically a flame inhibitor) is typically used for polyolefins. This is available from Unitex chemical under the tradename Uniplex FRX 44-94S. Bromine-containing retardants, Uniplex BAP-755 (brominated alkyl phosphate) and Uniplex FRP-64 (poly (2,6-dibromophenylene oxide)) are also viable. For high performance, the polymeric, flame retardant is desirable but it requires a synergist, for which the high phosphorous-containing FRX 44-94S is suitable. However, Great Lakes Chemicals' tetrabromobisphenol A is preferred for polymer solubility.

Organophosphates serve as hydrophilic plasticizers that function by increasing the water or some other highly polar liquid retention of the membrane in HUX cell in the application environment. The increased water or some other highly polar liquid content may improve performance by increasing membrane permeability as well as reduce flammability, since substantially more water or some other highly polar liquid must evaporate before flames may spread to the cell. In the process, the evaporation of water or some other highly polar liquid suppresses smoke. Also, these can potentially function as synergists for bromine-containing flame retardants. These are trialkyl phosphates, such as trimethyl phosphate, triethyl phosphate, tripropyl phosphate and tris(2-ethyl hexyl) phosphate.

Antioxidants (and thermal stabilizers) can increase shelf life of HUX cells by circumventing the auto-oxidation of the hydrophilic polymer during storage. However, a more important advantage is the ability to reduce oxidation of the sulfonated hydrophilic polymer in the HUX cell during operation since at low humidity the polymer is continuously subject to the transfer of heat and thus, will see temperatures as high as 37° C. Oxidation of organic impurities may result and reduce performance this be minimized with the use of antioxidants. These are basically hindered phenols of high molecular weight and include: stearyl-3-(3',5'-di-tert-butyl-4-hydroxyphenyl) propionate (BNX 1076) and tetrakis[methylene-3 (3',5'-di-tert-butyl-4-hydroxyphenyl)propionate] methane (BNX 1010) both available from Mayo Corp. and poly(phenol-formaldehyde) novalac resin (HRJ-12700) available from Schenectady International. Peroxide decomposers add benefit as synergists to hindered phenols, these are aryl phosphites; such as Tris(2,4-ditert-butylphenyl) phosphite (Benafos 1680). UV stabilizers are important for outdoor applications; these are light absorbers with a broad absorption range of which benzotriazoles are preferred. Ciba's Tinuvin 384-2 (Benzene propionic acid (3-2H-benzotriazol-2-yl)-5-(1,1-di-methylethyl-4)-hydroxy, $C_7$-$C_9$-branched and linear alkyl esters) is suitable because of good thermal and environmental stability. Hindered amine light stabilizers (HALS) may be suitable. However, free amines form salts that may reduce water or some other highly polar liquid transport, these are less preferred. Therefore, nitroso-alkyl and specifically nitroso-alkyl ethers containing HALS are preferred for these polymers to maximize their effectiveness as stabilizers.

The HUX support material is preferably, but not limited to, a polyolefin, spaced-member, fiber netting. Fiber extrusion followed by melt bonding is a common method to prepare the netting, however, other methods can be used by themselves or in combination. These include injection molding, compression molding, fiber extrusion with solvent bonding, spin bonding, and ultrasonic welding.

Suitable materials for reinforcing substrate 14 include woven, nonwoven, knit and cross-laid fabrics; in the context of the present invention, the term 'fabrics' is defined as including meshes and nettings. Microporous films may also be used. The fabric of a reinforcing substrate may be composed of synthetic fibers or filaments, glass yarns, non-corroding metal fibers, such as nickel fibers, or carbon fibers. The fibers, filaments or yarns should be ones to which the water-conducting polymer film adheres strongly. Suitable synthetic fibers include polyolefins, particularly polyethylene or polypropylene, and polyesters. The fibers may have organic or inorganic sizing agents or coupling agents applied, including polyvinylalcohol, starches, oil, polyvinylmethylether, acrylic, polyester, vinylsilane, aminosilane, titanate, and zirconate. Silicone-based lubricants are sometimes employed for greater tear strength. A microporous film may be composed of any synthetic polymer to which the humidity-conducting polymer adheres. In particular, the films may have a polyolefin composition, and more particularly, polyethylene. Films having a fluoropolymer composition may also be used. A membrane according to the present invention may be prepared by impregnating the substrate with a humidity-conducting polymer. This may be done by any of several known methods. These methods include direct coating, wherein a solution of the humidity-conducting polymer in a suitable solvent, such as a lower alcohol, in particular, methanol or propanol. The benefit of direct coating is that it reduces the number of sub-assemblies and parts and, thus, reduces costs. Low cost fabrication is an object of the invention. Indirect coating methods, such as solution casting, may also be used.

Sequential buildup facilitates the manufacturing of the overall composite; coating is typically continued until a homogenous sheet is formed when reinforcement may or may not be completely coated. Formulations that readily wet the substrate are available at low cost and produce composites without holes or other defects are preferred. Alternatively, the water-conducting polymer may be applied to the reinforcing substrate by hot roll laminating it with reinforcing substrate, thus eliminating the need for multiple coating passes. The water-conducting polymer film may also contain a ceramic filler, if desired. Finally, a membrane composed of nonwoven fabric may be manufactured by adding staple-pulped fiber to solution of the water conducting polymer, and coating on a release substrate.

Micro-reinforced composites can benefit from crosslinking chemistries described as well. These are microporous supports those that have pore sizes less than a few microns and exceptionally large open volumes greater than 70%, and a thickness of less than a mil, fabricated from mostly polyolefins; polyethylene (high density or ultra high molecular weight) and propylene, but polytetrafluoroethylene is very common, polyester and polyamide to a lesser extent. In the process, the polymer is impregnated into the support but any number of processes; solution casting, melt impregnation, using a knife blade, knife-over-roll, reverse-roll and others. The polymer electrolyte is crosslinked within the support and depending on the chemistry may be grafted to the support to some extent. The micro-reinforced polymer electrolyte membrane is substantially stronger and if impregnated properly has vastly reduced water uptake and thus, improved dimensional stability than the crosslinked PEM alone. The one challenge is that if sufficient grafting of the PEM to the reinforcement is not achieved these materials can exhibit interfacial failure when hydration cycled in the application. So proper choice of initiator and coupling agent is necessary for maximum benefit. Pretreatment of the reinforcement beforehand to introduce functional groups on the surfaces is important for maximum adhesive strength. In the context of the present invention, alkyl is intended to include linear, branched, or cyclic hydrocarbon structures and combinations thereof. Lower alkyl refers to alkyl groups of from 1 to 4 carbon atoms. Lower alkyl groups include methyl, ethyl, n-propyl, isopropyl, and n-, s- and t-butyl. Preferred alkyl groups are those of $C_{20}$ or below. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl.

Figure 2:
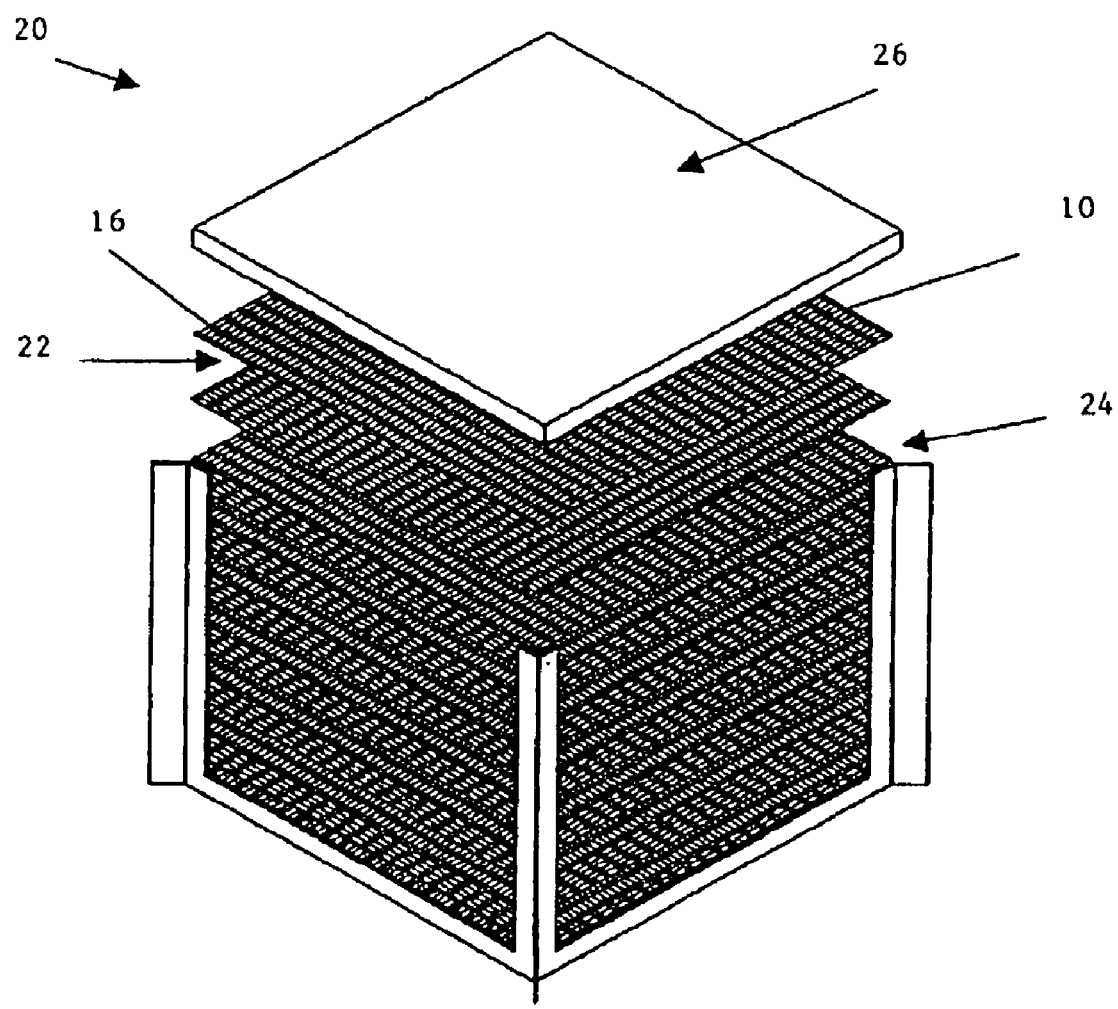
FIG. 2 is a partially exploded view of a humidity exchange cell according to the present invention.
Figure 3:
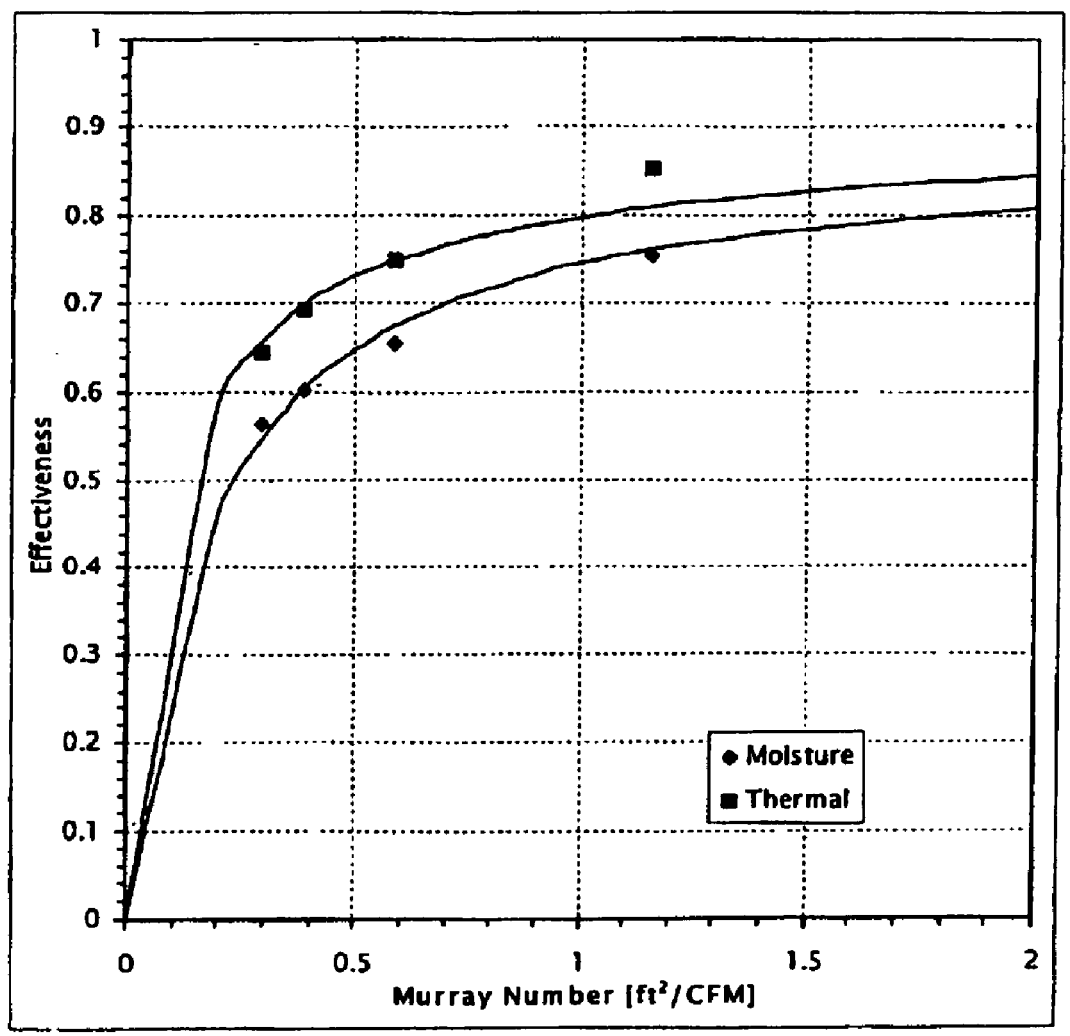
FIG. 3 is a graph showing high heat and water transfer using a humidity exchange cell according to the present invention.

FIG. 2 is a partially exploded view of a humidity exchange cell or ventilator core 20 including a hydrophilic organic-inorganic hybrid membrane 10, a first chamber 22 for containing a first fluid, a second chamber 24 for containing a second fluid and a number of spacers or ribs 16 which are adhered to membrane 10. Cell 20 includes a series of alternating first and second chambers. A cap 26 may be used to enclose the topmost and/or bottommost chambers.

The membranes 10 are stacked one on top of another to form ventilator core 20 as shown in FIG. 2. The orientation of the each layer is rotated by 90 degrees as it is put down into the core. This forms the cross-flow pattern for the exchange of heat, ions and/or moisture within the core. Not shown, but fully realizable, is a counter-flow arrangement of the layers. Here the layers would be in a single orientation, with no rotation, in the core. A complex manifold would be designed to route gas streams to every other layer in the stack. These manifolds would be placed on opposite sides of the core. The non-manifolded sides of the core could be sealed to the external environment if necessary.

Spacer 16, as shown in FIGS. 1 and 2, is configured as a series of ribs, typically adhered to the humidity-conducting polymer surface. These ribs may have a synthetic polymer composition, particularly, PVC, and may be rectangular or circular in cross-section. In other embodiments (not shown), spacer 16 may be a corrugated paper or plastic sheet. In some embodiments, spacer 16 may be a series of adhesive beads. The adhesive may be a hot-melt, cold-melt, or solid adhesive; it may be either thermoplastic or thermosetting. The HUX cell may possess certain specific sub-elements to be effective as a mass (i.e. moisture) exchanger. The basic sub-elements are as follows: (a) a hydrophilic organic-inorganic hybrid membrane formulated to be highly permeable to water or some other highly polar liquid or gas, (b) a support matrix to impart mechanical integrity to the membrane and to maintain planarity during operation and (c) a manifold for the distribution of a fluid across the face of the membrane. The disclosed HUX cell is of unitary design in that it incorporates all three sub-elements into a complete cell structure that can be fabricated as a single unit. The device can be built up of this structure by simple stacking and securing the cells in an enclosure.

The organic-inorganic hybrids of the present invention can be used in many applications, such as in Fuel Cells as an electrolyte; Water Electrolyzers as an electrolyte; Acid Electrolyte Battery Electrolyte Separators; Super-Capacitors Electrolytes; Separation Cell Electrolyte Barriers for Metal Recovery Processes; and the like. These applications are described in more detail in U.S. Pat. Nos. 5,468,574; 5,679,482; 5,677,074 and 6,110,616, to Dais Analytic Corporation. The hybrids may also be used as moisture transfer agents. These materials are useful in High Volume Air Conditioning (HVAC); Low Temperature Distillation Membranes for Desalination; Prevaporation (Industrial Gas Modification and Clean-up); Air Moisture Removal/Augmentation for Industrial Processes, Medical Applications, Building Environments (Permeable Wall Coatings), and Tents or Temporary Enclosures. These applications are described in more detail in U.S. Pat. Nos. 6,413,298, 6,383,391, 5,840,387 and 6,306,419; and published U.S. Patent Application Nos. 20030106680 and 20030118887 to Dais Analytic Corporation.

The invention claimed is:

1. An organic-inorganic hybrid derived from combining at least one inorganic alkoxide and a sulfonated hydrogenated block copolymer having the general configuration A-B, A-B-A, (A-B)n, (A-B-A)n, (A-B-A)nX, (AB)nX or mixtures thereof, where n is an integer from 2 to 30, and X is coupling agent residue and wherein:
   a. prior to hydrogenation each A block is a mono alkenyl arene polymer block and each B block is a controlled distribution copolymer block of at least one conjugated diene and at least one mono alkenyl arene;
   b. subsequent to hydrogenation 0–10% of the arene double bonds have been reduced, and at least about 90% of the conjugated diene double bonds have been reduced;
   c. each A block having a number average molecular weight between 3,000 and 60,000 and each B block having a number average molecular weight between 30,000 and 300,000;
   d. each B block comprises terminal regions adjacent to the A blocks that are rich in conjugated diene units and one or more regions not adjacent to the A blocks that are rich in mono alkenyl arene units;
   e. the total amount of mono alkenyl arene in the hydrogenated block copolymer is 20 percent weight to 80 percent weight;
   f. the weight percent of mono alkenyl arene in each B block is between 10 percent and 75 percent; and
   g. at least 25% of the aromatic rings of the alkenyl arene are sulfonated.

2. An organic-inorganic hybrid according to claim 1 wherein the mono alkenyl arene is styrene and the conjugated diene is selected from the group consisting of isoprene and butadiene.

3. An organic-inorganic hybrid according to claim 1 wherein the conjugated diene is butadiene, and wherein 20 to 80 mol percent of the condensed butadiene units in block B have 1,2-configuration prior to hydrogenation.

4. An organic-inorganic hybrid according to claim 1 wherein block B has a styrene blockiness index of less than 40 percent.

5. An organic-inorganic hybrid according to claim 1 wherein each block B has a center region with a minimum ratio of butadiene units to styrene units.

6. An organic-inorganic hybrid according to claim 1 wherein the mono alkenyl arene is styrene, and wherein the weight percentage of styrene in block B is between 20 percent and 70 percent, and the styrene blockiness index of is less than 10 percent, the styrene blockiness index being the proportion of styrene units in the block B having two styrene neighbors on the polymer chain.

7. An organic-inorganic hybrid according to claim 1 wherein the weight percentage of styrene in the block copolymer is between 60 and 80 weight percent and the molecular weight of the A blocks are between 10.000 and 35,000.

8. An organic-inorganic hybrid according to claim 1 wherein between 25 and 90 percent of the aromatic rings have a sulfonic acid or sulfonate group.

9. An organic-inorganic hybrid according to claim 1 wherein from 25 percent to 70 percent of the aromatic rings have a sulfonic acid or sulfonate group.

10. An organic-inorganic hybrid according to claim 1 wherein from 25 percent to 50 percent of the aromatic rings have a sulfonic acid or sulfonate group.

11. An organic-inorganic hybrid according to claim 1, wherein said inorganic alkoxide has the formula:

$$R^1_m MR^2_n R^3_p R^4_{(4-m-n-p)}$$

wherein
   M is Si, Ti, Zr, or mixtures thereof;
   $R^1$, $R^2$, $R^3$ and $R^4$ are independently alkyl, substituted alkyl, alkenyl, aryl, acyloxy, alkoxy, halo, amino, mercapto, or epoxy;
   m, n and p are independently 0, 1, 2, 3 or 4; and
   at least one of $R^1$, $R^2$, $R^3$ and $R^4$ is alkoxy.

12. An organic-inorganic hybrid according to claim 11, wherein M is Si or Zr.

13. An organic-inorganic hybrid according to claim 11, wherein M is Si.

14. An organic-inorganic hybrid according to claim 11, wherein said inorganic alkoxide is vinyltriethoxysilane or vinyltrimethoxysilane.

15. An organic-inorganic hybrid according to claim 11, wherein
   $R^1$ is alkyl, substituted alkyl, alkenyl, acyloxy, halo, amino, mercapto, or epoxy;
   $R^2$ is alkyl, substituted alkyl, alkenyl, acyloxy, alkoxy, halo, amino, mercapto, or epoxy;
   $R^3$ and $R^4$ are alkoxy; and
   m is 1.

16. An organic-inorganic hybrid according to claim 11, wherein
- $R^1$ is alkyl, substituted alkyl, alkenyl, acyloxy, halo, amino, mercapto, or epoxy;
- $R^2$, $R^3$ and $R^4$ are alkoxy; and
- m is 1.

17. A membrane for transferring heat, ions, moisture, polar liquids and/or polar gases, said membrane comprising the organic-inorganic hybrid of claim 1.

18. An organic-inorganic hybrid according to claim 11, wherein said sulfonated hydrogenated block copolymer comprises from 20 weight percent to 80 weight percent styrene.

19. An organic-inorganic hybrid according to claim 11, comprising from 25 mole percent to 80 mole percent of units derived from styrene sulfonate.

* * * * *